United States Patent
Hsieh et al.

(10) Patent No.: US 10,606,291 B2
(45) Date of Patent: Mar. 31, 2020

(54) POWER OUTPUT CONTROL MODULE FOR A POWER DISTRIBUTOR

(71) Applicant: CYBER POWER SYSTEMS INC., Nangang District, Taipei (TW)

(72) Inventors: Hung-Ming Hsieh, Taipei (TW); Yung-Hao Peng, Taipei (TW); Yu-Chen Kuo, Taipei (TW)

(73) Assignee: CYBER POWER SYSTEMS INC., Taipei (TW)

( * ) Notice: Subject to any disclaimer, the term of this patent is extended or adjusted under 35 U.S.C. 154(b) by 222 days.

(21) Appl. No.: 15/642,761

(22) Filed: Jul. 6, 2017

(65) Prior Publication Data
US 2019/0011942 A1   Jan. 10, 2019

(51) Int. Cl.
*G05F 1/40* (2006.01)
*H02J 4/00* (2006.01)
*H02J 7/02* (2016.01)
*H02J 7/34* (2006.01)

(52) U.S. Cl.
CPC ............... *G05F 1/40* (2013.01); *H02J 4/00* (2013.01); *H02J 7/02* (2013.01); *H02J 7/34* (2013.01); *H02J 2207/10* (2020.01)

(58) Field of Classification Search
CPC ................................ H02J 4/00; G05F 1/40
USPC .................................................... 307/26
See application file for complete search history.

(56) References Cited

U.S. PATENT DOCUMENTS

| | | | | |
|---|---|---|---|---|
| 2010/0188066 A1* | 7/2010 | Rodenhiser | ............ | H02J 9/062 323/302 |
| 2011/0254371 A1* | 10/2011 | Galsim | ................... | G06F 1/263 307/39 |
| 2012/0001488 A1* | 1/2012 | Puschnigg | ........... | H01R 13/665 307/40 |

FOREIGN PATENT DOCUMENTS

| | | |
|---|---|---|
| CN | 201690278 U | 12/2010 |
| CN | 203521799 U | 4/2014 |
| CN | 105334898 A | 2/2016 |
| CN | 205509466 U | 8/2016 |
| TW | M379266 U | 4/2010 |
| WO | 2016194584 A1 | 12/2016 |

* cited by examiner

*Primary Examiner* — Hal Kaplan
*Assistant Examiner* — Swarna N Chowdhuri
(74) *Attorney, Agent, or Firm* — Rabin & Berdo, P.C.

(57) ABSTRACT

A power output control module for power distribution is installed inside a power distributor that is connected to an AC power source and multiple electronic devices to control the AC power outputted to the electronic devices. The power output control module continuously detects whether the AC power inputted is normal. When the AC power source is disconnected by accident, a latch relay is controlled to switch to be open, so that the AC power source and the electronic devices are disconnected. This prevents the instantaneous surge current from damaging the electronic devices when the AC power source resumes its normal output and also increases the safety and reliability of electronic devices.

11 Claims, 7 Drawing Sheets

POWER OUTPUT CONTROL MODULE FOR A POWER DISTRIBUTOR

BACKGROUND OF THE INVENTION

1. Field of the Invention

The invention relates to a power distributor and, in particular, to a power output control module for a power distributor.

2. Description of Related Art

There is a power distributor in the conventional technique that connects one AC power source to multiple electronic devices. The AC power source provides the electrical power required by the electronic devices. The power distributor distributes received electrical power to the connected electronic devices for them to operate. In order to control the AC power source to supply power to the electronic devices, the power distributor is equipped with multiple relays. The relays are connected between the AC power source and the corresponding electronic devices. The Close and Open states of a relay determine whether electrical power is supplied to the corresponding electronic device.

The relay in early power distributors requires electrical power to maintain an excitation coil inside the relay for a switch inside the relay to stay closed through magnetic attraction. The tradeoff to this necessity is more power consumption. When the AC power source disconnects, the electrical power inside the power distributor is also used up. Without power supply, the relay cannot keep its switch staying closed, such that the switch is open and the AC power source is disconnected from the electronic devices. As early relays usually consume more electrical power, latch relays are brought into play to resolve that even when the AC power source stops supplying power and the electrical power inside the power distributor is used up, the latch relay still stays closed without breaking the switch therein for lack of electrical power. To that end, latch relays are very power effective.

However, the feature of staying closed even when the latch relay is disconnected from power makes it possible for the latch relay to generate a large surge current or inrush current at the instant when the AC power source resumes supplying power. Such surge current or inrush current can directly enter the electronic devices via the constantly closed latch relays to cause malfunction in the electronic device or damage the electronic devices. Worse yet, it may even result in a serious danger. Therefore, it is imperative to improve the power distributors in the conventional technique.

SUMMARY OF THE INVENTION

In view of the foregoing drawbacks, the invention provides a power output control module for a power distributor. The power output control module continuously monitors whether AC power source is functioning normally. When the AC power source abnormally disconnects, the latch relays of the power output control module are controlled to be open. This prevents surge current or inrush current from entering and damaging the electronic devices at the instant when the AC power source resumes supplying power and also achieves the goal of increasing the safety and reliability of electronic devices.

To achieve the aforementioned objective, the disclosed power output control module for a power distributor includes:

at least one latch relay, each of which is adapted to connect to an AC (Alternating Current) power source and at least one electronic device;

at least one relay driver, each of which is connected to a corresponding latch relay and a DC (Direct Current) power supply path to control the corresponding latch relay to be closed or open;

an AC power detection circuit connected to the AC power source to detect whether the AC power source is supplying electrical power and to generate an output voltage signal corresponding to the electrical power;

a processor connected to the at least one relay driver, the power detection circuit, and the DC power supply path to drive the at least one relay driver to be open according to the output voltage signal; and a power storing device connected to the DC power path, the at least one relay driver, and the processor for storing the electrical power and providing the stored electrical power to the at least one relay driver and the processor.

According to the above-mentioned description, it can be seen that the AC power detection circuit continuously monitors the power supply of the AC power source to generate a corresponding output voltage signal and sends the output voltage signal to the processor. The processor controls the at least one relay driver to drive the latch relay to be open according to the output voltage signal. This mechanism prevents surge current or inrush current from entering and damaging the electronic devices when the AC power source resumes supplying power. The invention therefore achieves the goal of increasing the safety and reliability of electronic devices.

DETAILED DESCRIPTION OF THE PREFERRED EMBODIMENT

Figure 1:
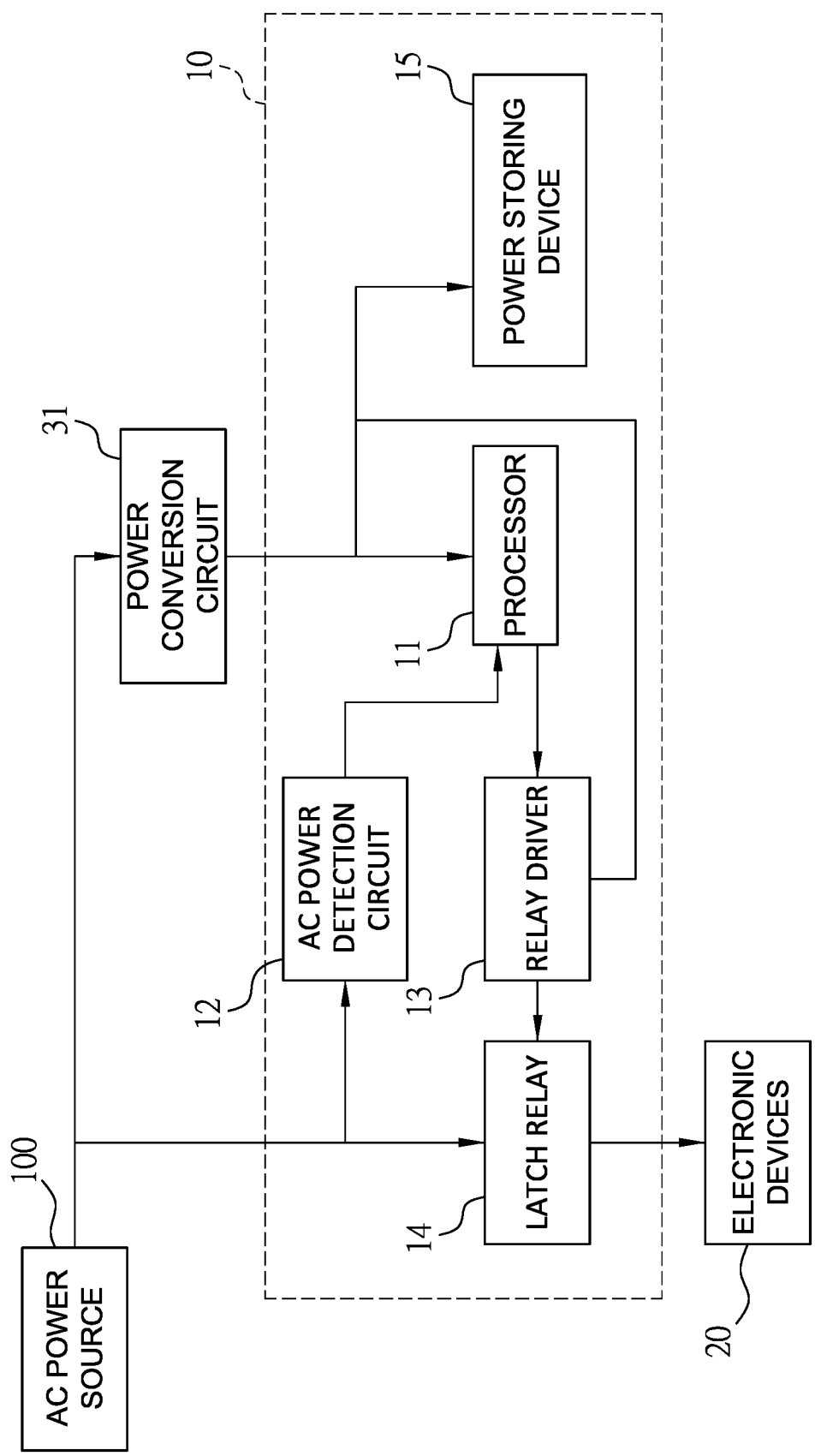
FIG. 1 shows a functional block diagram of a power output control module according to the first embodiment of the present invention.

Please refer to FIG. 1 for a first embodiment of a disclosed power output control module for a power distributor. A power distributor (not shown) has the disclosed power output control module 10 installed therein, and is connected between an AC (Alternating Current) power source 100 and multiple external electronic devices 20. The power output control module 10 is connected to a power supply path of the power distributor. In an example, the AC power source 100 is the mains power.

In the present embodiment, the power output control module 10 is connected to the AC power source 100 via the power supply path. A power conversion circuit 31 is connected between the AC power source 100 and the power output control module 10, and converts the AC power provided by the AC power source 100 into a DC (Direct Current) power and supplies the DC power to the power output control module 10.

The power output control module 10 includes a processor 11, an AC power detection circuit 12, a relay driver 13, a latch relay 14, and a power storing device 15. The processor 11 is connected to the AC power detection circuit 12, the relay driver 13, and the power conversion circuit 31. The relay driver 13 is connected to the latch relay 14 and the power conversion circuit 31. The processor 11 and the relay driver 13 receive the DC power outputted from the power conversion circuit 31. The power storing device 15 is connected to the processor 11, the relay driver 13, and the power conversion circuit 31. When the AC power source 100 supplies the AC power, the power storing device 15 stores the DC power. When the AC power source 100 stops supplying the AC power, the power storing device 15 supplies the DC power to the processor 11 and the relay driver 13, and to the latch relay 14 via the relay driver 13.

Figure 2:
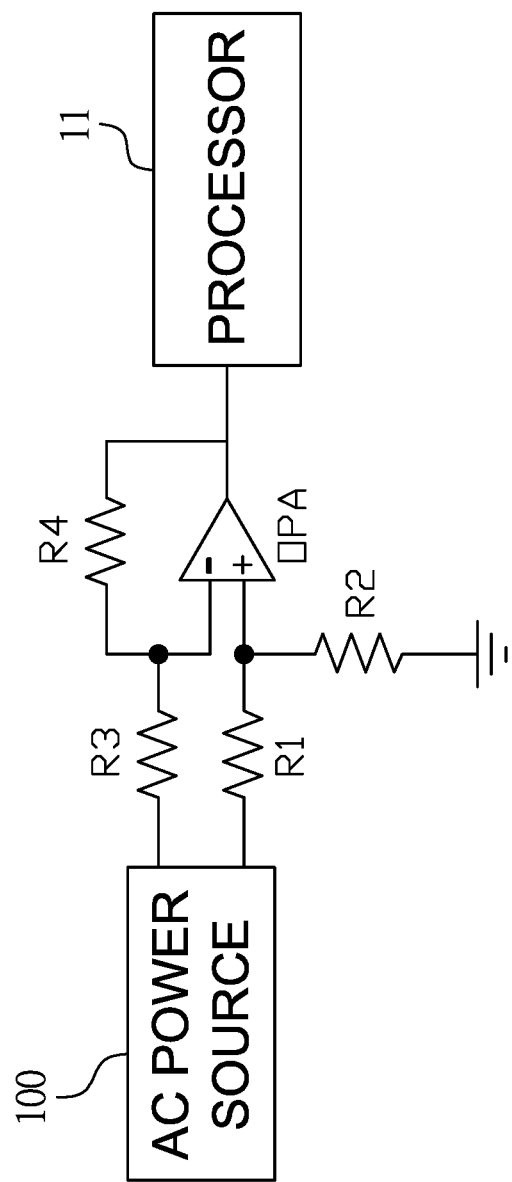
FIG. 2 shows a circuit diagram of an AC power detection circuit of the power output control module in FIG. 1.

To explain practical implementation of the AC power detection circuit 12, please refer to FIGS. 1 and 2. The AC power detection circuit 12 includes an operational amplifier OPA, a first resistor R1, a second resistor R2, a third resistor R3, and a fourth resistor R4.

The operational amplifier OPA has an output terminal, a first input terminal, and a second input terminal. The output terminal of the operational amplifier OPA is connected to the processor 11. The first input terminal of the operational amplifier OPA is connected to one end of the first resistor R1 and one end of the second resistor R2. The other end of the first resistor R1 is connected to the line terminal of the AC power source 100. The other end of the second resistor R2 is connected to the ground. The second input terminal of the operational amplifier OPA is connected to one end of the third resistor R3 and one end of the fourth resistor R4. The other end of the third resistor R3 is connected to the neutral terminal of the AC power source 100. The other end of the fourth resistor R4 is connected to the output terminal of the operational amplifier OPA. The first input terminal and the second input terminal of the operational amplifier OPA receive electrical power from the AC power source 100. An output voltage signal Vo is outputted from the output terminal of the amplified OPA to the processor 11. The processor 11 determines whether the AC power source 100 is supplying electrical power or not according to the output voltage signal Vo.

Specifically, the way of determining whether the AC power source 100 is supplying electrical power or not can be described as follows. The output voltage signal Vo outputted from the operational amplifier OPA is calculated to generate a calculated value Vrms, which is compared with a threshold value Vth. When the calculated value Vrms is greater than the threshold value Vth, it means that the value Vrms obtained by the processor 11 according to the received output voltage signal Vo is a first voltage level representing that the AC power source 100 is supplying electrical power. When the calculated value Vrms is smaller than the threshold value Vth, it means that the value Vrms obtained by the processor 11 according to the received output voltage signal Vo is a second voltage level representing that the AC power source 100 stops supplying electrical power. The foregoing description concerning the way of determining whether the AC power source 100 is supplying electrical power is taken as only an example of the invention and should not be used to restrict the scope thereof.

Figure 3:
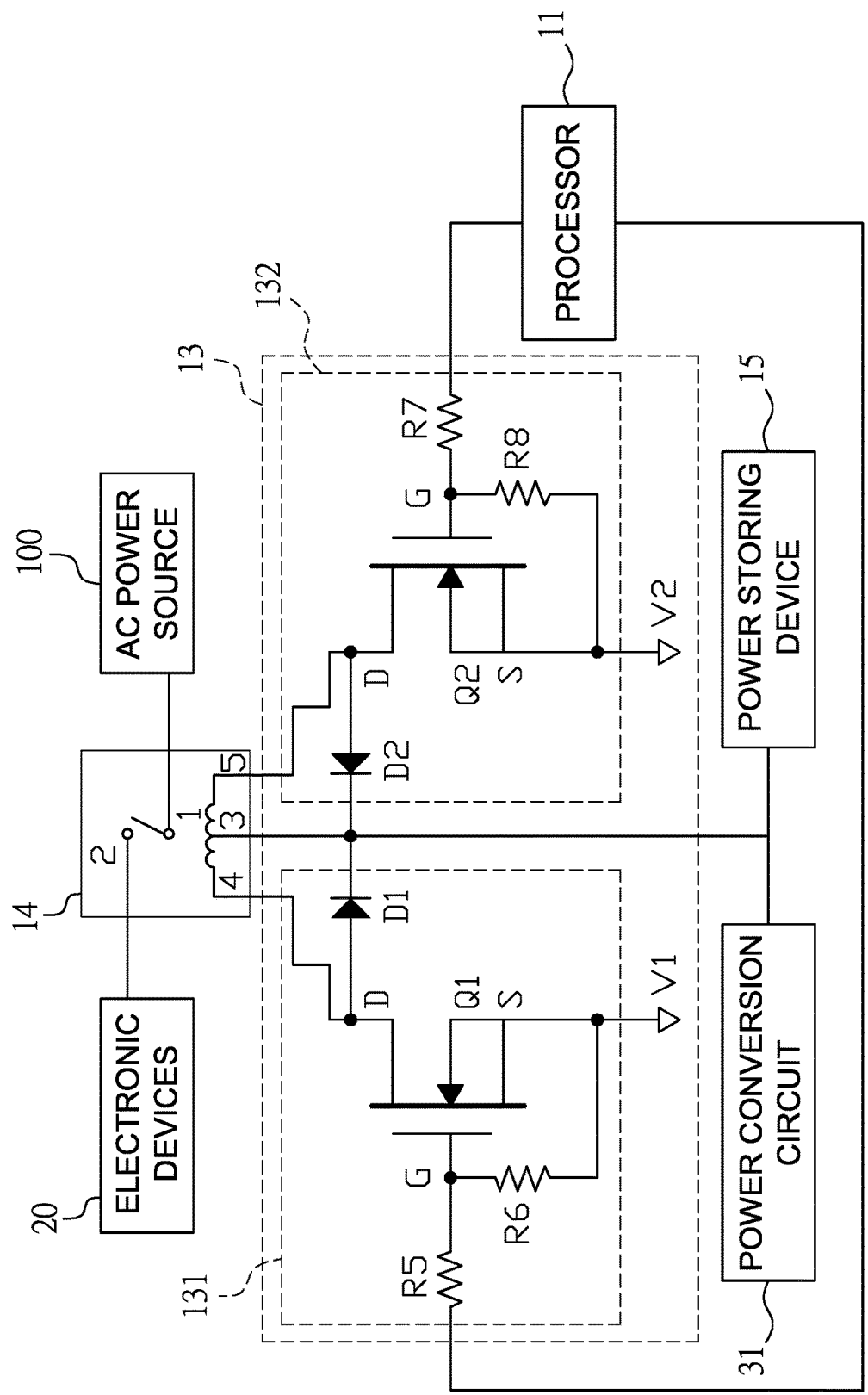
FIG. 3 shows a circuit diagram of a relay driver of the power output control module in FIG. 1.

Please refer to FIGS. 1 and 3 for the circuits of the relay driver 13 and the latch relay 14. The relay driver 13 includes a turn-on unit 131 and a turn-off unit 132 for driving the latch relay 14 to be closed or open.

The turn-on unit 131, the latch relay 14, the power storing device 15, and the power conversion circuit 31 form a turn-on loop that controls the latch relay 14 to be closed.

The turn-off unit 132, the latch relay 14, the power storing device 15, and the power conversion circuit 31 form a turn-off loop that controls the latch relay 14 to be open.

One end of the turn-on unit 131 is connected to the latch relay 14, and the other end thereof is connected to the processor 11. The turn-on unit 131 includes a fifth resistor R5, a sixth resistor R6, a first transistor Q1, and a first diode D1.

One end of the turn-off unit 132 is connected to the latch relay 14, and the other end thereof is connected to the processor 11. The turn-off unit 132 includes a seventh resistor R7, an eighth resistor R8, a second transistor Q2, and a second diode D2. Each of the first transistor Q1 and the second transistor Q2 has a first terminal (Gate), a second terminal (Drain), and a third terminal (Source). In this embodiment, the first transistor Q1 and the second transistor Q2 are metal oxide semiconductor field effect transistors (MOSFET).

The latch relay 14 includes a switch terminal 1, an output terminal 2, and an excitation coil. The excitation coil includes a power terminal 3, a first loop terminal 4, and a second loop terminal 5. The switch terminal 1 can be switched to connect to the output terminal 2.

In the conductive loop, the negative terminal of the first diode D1 is connected to the power terminal 3, the power storing device 15, and the power conversion circuit 31. The positive terminal of the first diode D1 is connected to the first loop terminal 4 and the second terminal (Drain) of the first transistor Q1. The first terminal (Gate) of the first transistor Q1 is connected to one end of the fifth resistor R5 and one end of the sixth resistor R6. The other end of the fifth resistor R5 is connected to the processor 11. The other end of the sixth resistor R6 is connected to the third terminal (Source) of the first transistor Q1 and a first reference voltage level V1.

In the turn-off loop, the negative terminal of the second diode D2 is connected to the power terminal 3, the power storing device 15, and the power conversion circuit 31. The positive terminal of the second diode D2 is connected to the second loop terminal 5 and the second terminal (Drain) of the second transistor Q2. The first terminal (Gate) of the second transistor Q2 is connected to one end of the seventh resistor R7 and one end of the eighth resistor R8. The other end of the seventh resistor R7 is connected to the processor 11. The other end of the eighth resistor R8 is connected to the third terminal (Source) of the second transistor Q2 and a second reference voltage level V2. The first reference voltage level V1 and the second reference voltage level V2 are identical.

The switch terminal 1 of the latch relay 14 is connected to the AC power source 100. The output terminal 2 of the latch relay 14 is connected to the electronic device 20.

Figure 4:
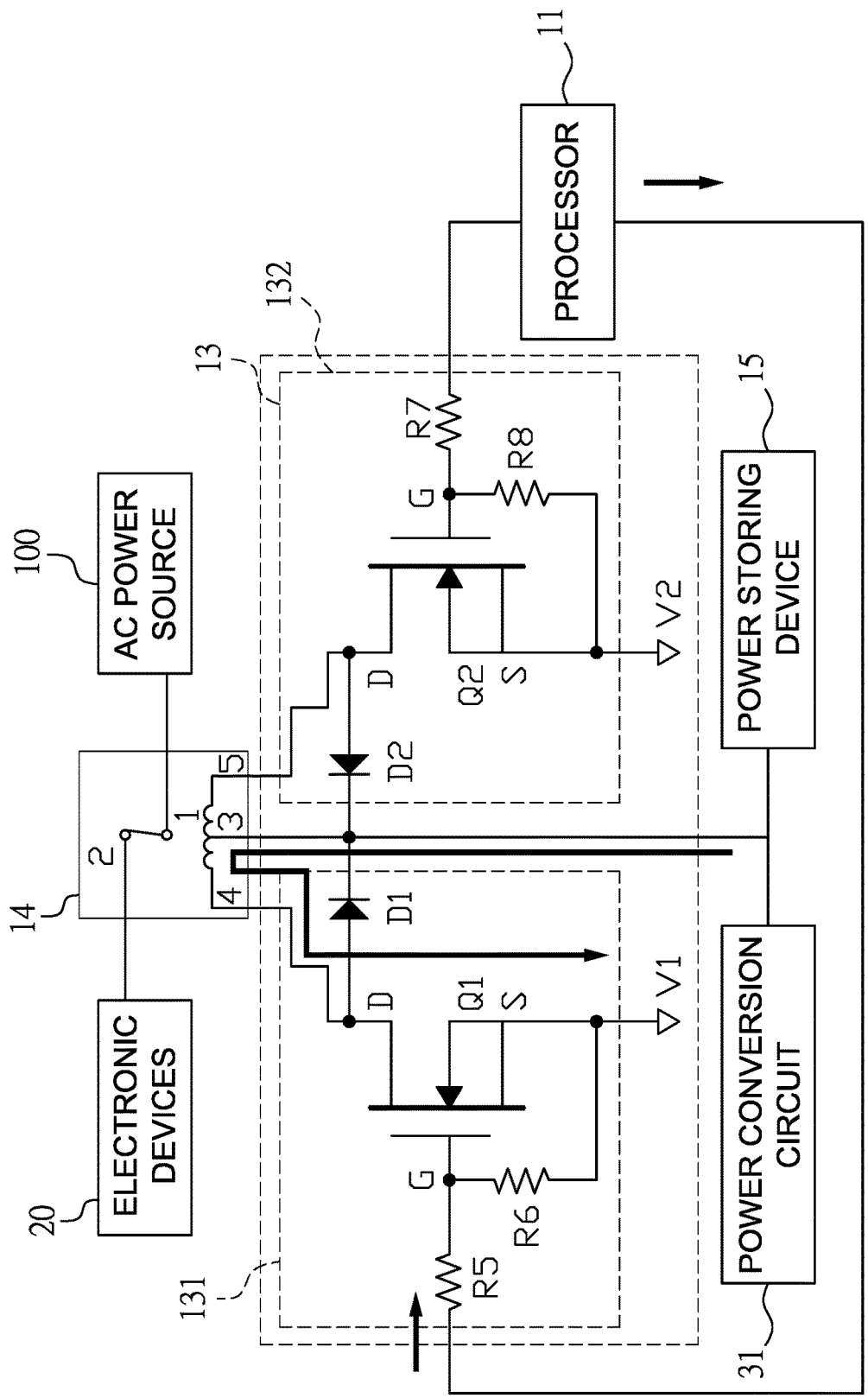
FIG. 4 is an operational circuit diagram showing the electrical current flow when the relay driver in FIG. 3 is in the closed state.

To explain how the latch relay 14 switches to become closed, please refer to FIGS. 1 and 4 that show electrical current flows of the relay driver 13. The processor 11 sends a turn-on control signal to the turn-on unit 131 of the relay driver 13 to turn on the first transistor Q1. The electrical power provided by the power conversion circuit 31 or the power storing device 15 first flows through the power terminal 3 of the latch relay 14 and the first loop terminal 4, then through the second terminal (Drain) and the third terminal (Source) of the first transistor Q1. The excitation coil is thus excited to attract the switch terminal 1 for the switch terminal 1 to be switched to the output terminal 2 and the latch relay 14 switch to become closed. The electrical power provided by the AC power source 100 is then transmitted via the latch relay 14 to the electronic device 20.

Figure 5:
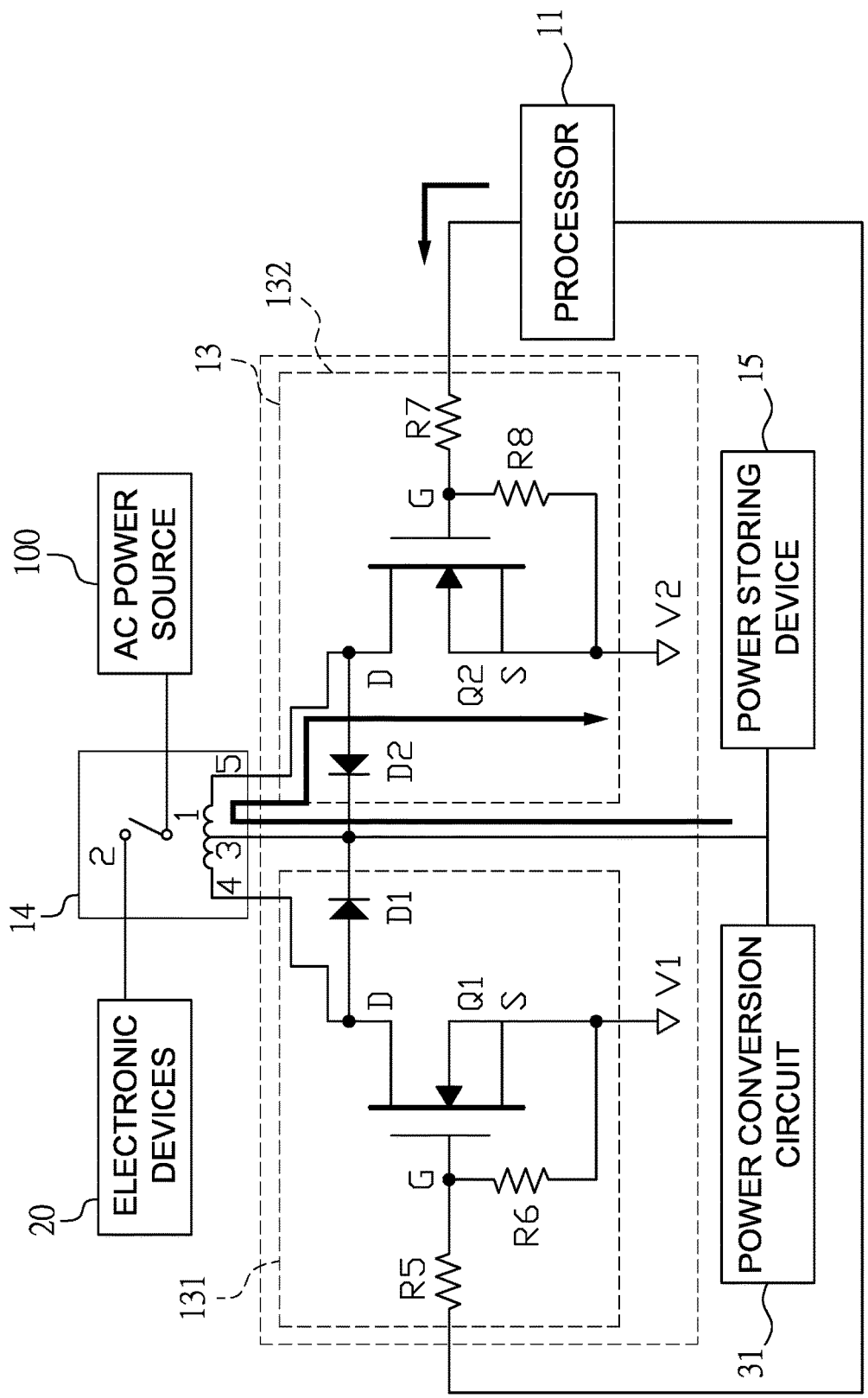
FIG. 5 is an operational circuit diagram showing the electrical current flow when the relay driver in FIG. 3 is in the open state.

Please refer to FIGS. 1 and 5 for the case about switching the latch relay 14 to the open state. The processor 11 sends a turn-off control signal to the turn-off unit 132 of the relay driver 13 to turn on the second transistor Q2. The electrical power provided by the power conversion circuit 31 or the power storing device 15 first flows thorough the power terminal 3 of the latch relay 14 and the second loop terminal 5, then through the second terminal (Drain) and the third terminal (Source) of the second transistor Q2. The excitation coil is thus demagnetized to disconnect the switch terminal 1 from the output terminal 2. The electrical power provided by the AC power source 100 therefore cannot be transmitted to the electronic device 20.

Figure 6:
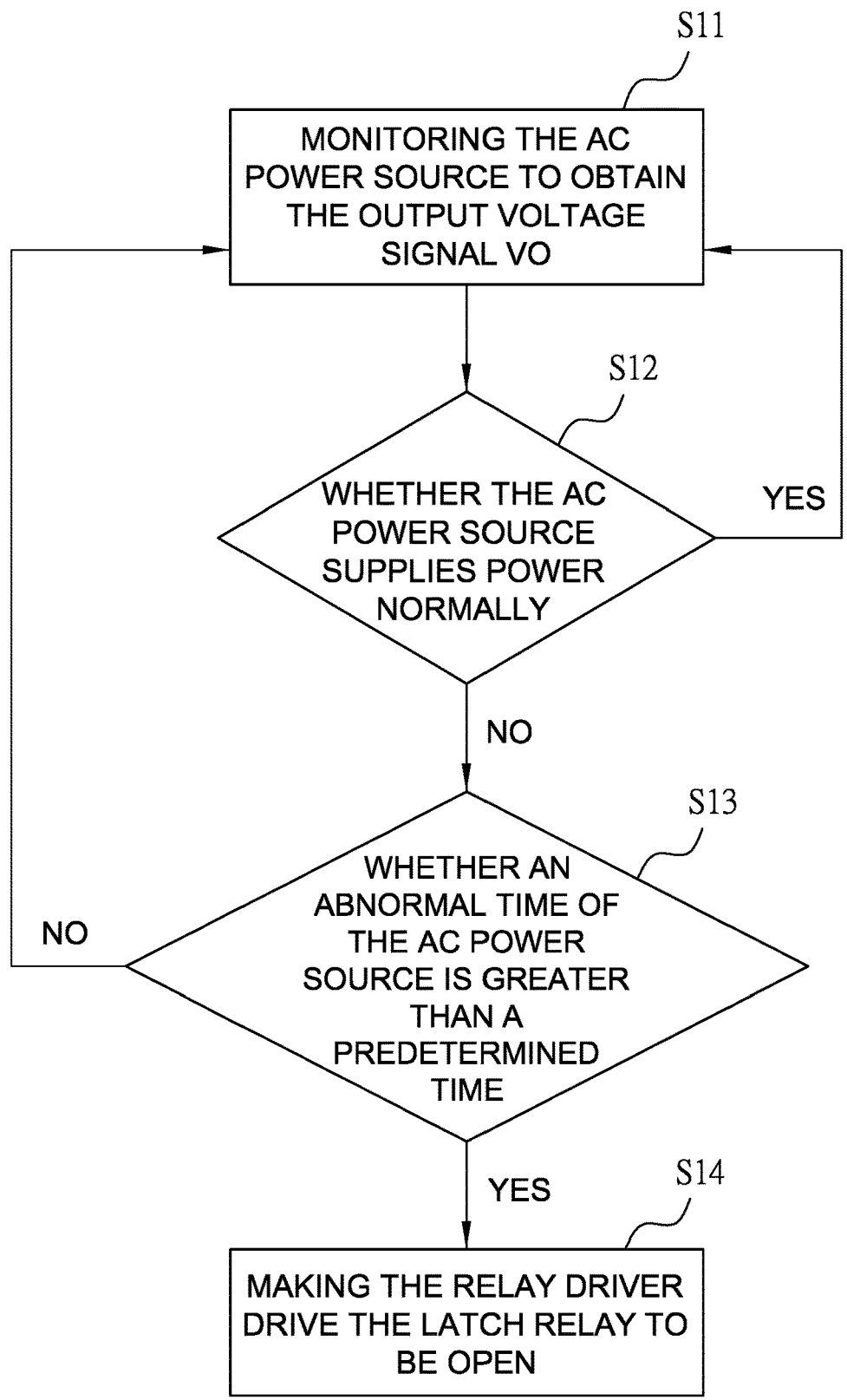
FIG. 6 is a flowchart showing how a processor of the power output control module in FIG. 1 determines whether the latch relay is in a closed state or an open state.

In this embodiment, the step in which the power output control module 10 determines whether to disconnect from the latch relay 14 is shown in FIG. 6 and includes the following steps:

In step S11, the AC power detection circuit 12 monitors the AC power source 100 to obtain the output voltage signal Vo.

In step S12, the processor 11 uses the output voltage signal Vo to determine whether the AC power source 100 supplies power normally. If not, step S13 determines whether an abnormal (power failure) time of the AC power source 100 is greater than a predetermined time.

In this embodiment, if the processor 11 determines that the AC power source 100 is supplying power normally, then the procedure goes back to step S11.

In step S14, if the processor 11 determines that the abnormal time of the AC power source 100 is greater than the predetermined time, the processor 11 sends a turn-off control signal to make the relay driver 13 drive the latch relay 14 to be open, so that the electrical power of the AC power source 100 cannot be provided to the electronic device 20.

Otherwise, the procedure goes back to step S11.

Specifically, what the processor 11 determines whether the abnormal time of the AC power source 100 is greater than the predetermined time means is that the processor 11 constantly receives the output voltage signal Vo transmitted from the AC power detection circuit 12 while counting time and comparing with the predetermined time. If the AC power source 100 resumes supplying power, the output voltage signal Vo is the first voltage level. The processor 11 stops time counting and returns to step S11 in which the AC power detection circuit 12 monitors the AC power source 100 to obtain the voltage signal Vo. On the other hand, when the predetermined time is up and the received output voltage signal Vo is still the second voltage level, the processor 11 drives the latch relay 14 to be open.

In this embodiment, the predetermined time is 10 milliseconds (ms) to 100 ms.

According to the above-mentioned contents, the AC power detection circuit 12 constantly monitors the AC power source 100 and outputs the output voltage signal Vo to the processor 11. When the AC power source 100 has a power failure, the processor 11 sends a turn-off control signal to make the relay driver 13 drive the latch relay 14 to open. This mechanism prevents the surge or inrush current from entering and damaging the electronic devices when the AC power source resumes supplying power. The invention therefore achieves the goal of increasing the safety and reliability of the electronic devices.

Figure 7:
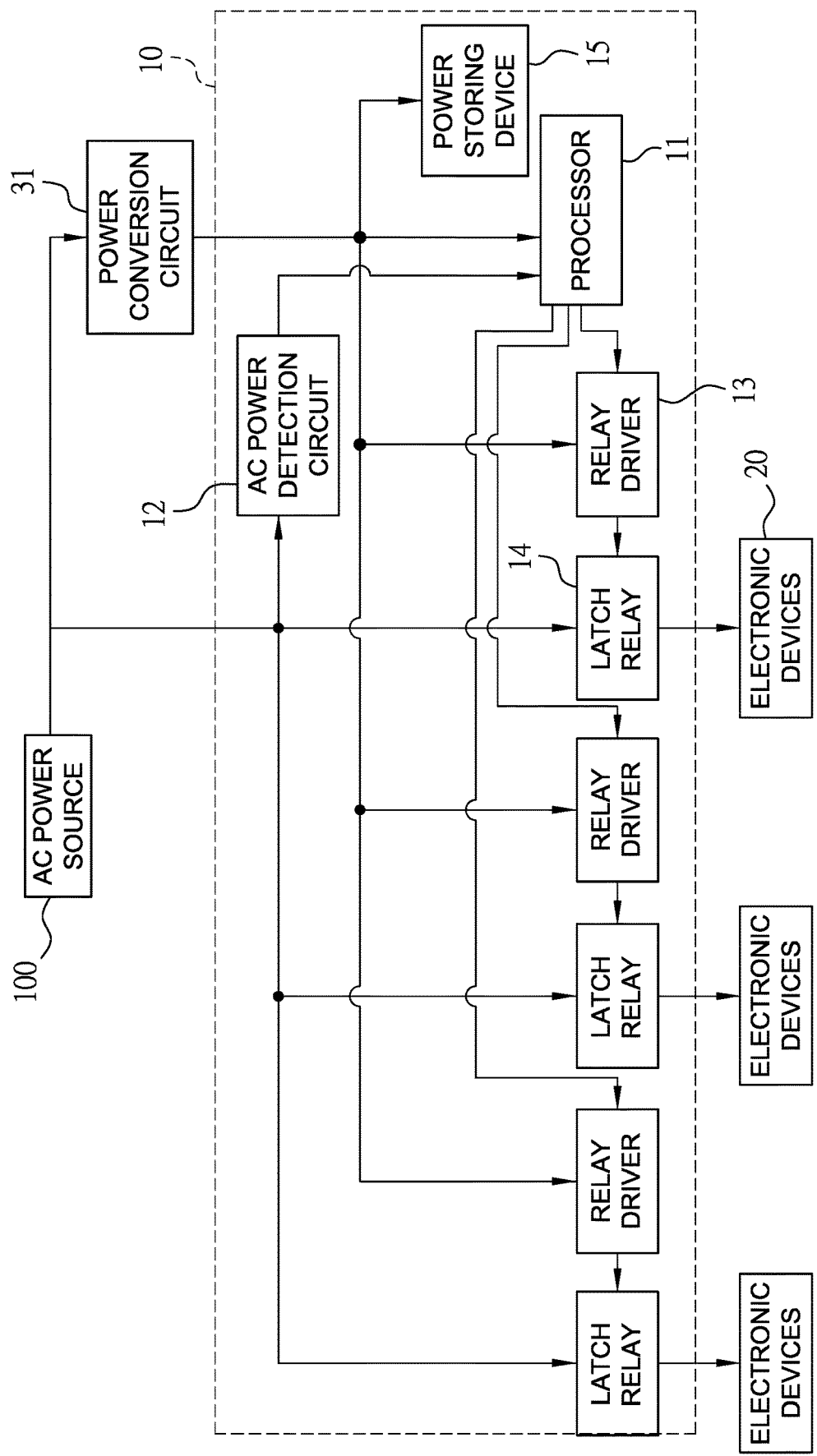
FIG. 7 shows a functional block of a power output control module according to a second embodiment of the present invention.

Please refer to FIG. 7 for a second embodiment of a disclosed power output control module for a power distributor. The second embodiment is generally the same as the first embodiment, except that the power output control module 10 of the second embodiment has multiple relay drivers 13 and multiple latch relays 14 respectively connected with the multiple relay drivers 13 for connection with multiple electronic devices 20. By virtue of the present embodiment, the power distributor can be connected to more electronic devices 20. Through the multiple relay drivers 13 and the multiple latch relays 14, the invention can protect more electronic devices. This enhances operational convenience, safety and reliability of electronic devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A power output control module for a power distributor, comprising:
    at least one latch relay, each of which is adapted to connect to an AC (Alternating Current) power source and at least one electronic device;
    at least one relay driver, each of which is connected to a corresponding latch relay and a DC (Direct Current) power supply path to control the corresponding latch relay to be closed or open;
    an AC power detection circuit connected to the AC power source to detect whether the AC power source is supplying electrical power and to generate an output voltage signal corresponding to the electrical power;
    a processor connected to the at least one relay driver, the AC power detection circuit, and the DC power supply path to drive the at least one relay driver to control the at least one latch relay to be open according to the output voltage signal, wherein the processor sends a turn-off control signal to the at least one relay driver to control the at least one latch relay to be open when detecting via the AC power detection circuit that the AC power source is abnormal; and
    a power storing device connected to the DC power path, the at least one relay driver, and the processor for storing the electrical power and providing the stored electrical power to the at least one relay driver and the processor.

2. The power output control module for a power distributor of claim 1, wherein the processor starts timing when the AC power source is abnormal, and the processor sends the turn-off control signal to the at least one relay driver to control the at least one latch relay to be open when an elapsed time exceeds a predetermined time, and the processor stops timing when the AC power source restores normally within the predetermined time.

3. The power output control module for a power distributor of claim 2, wherein the predetermined time is 10 ms (millisecond) to 100 ms.

4. The power output control module for a power distributor of claim 2, wherein the AC power source is determined to function normally when the processor determines that the output voltage signal is at a first voltage level, and the AC power source is determined to function abnormally when the processor determines that the output voltage signal is at a second voltage level.

5. The power output control module for a power distributor of claim 1, wherein the AC power detection circuit includes:
  an operational amplifier having an output terminal, a first input terminal, and a second input terminal, with the output terminal thereof connected to the processor;
  a first resistor with one end connected to the first input terminal of the operational amplifier and the other end connected to the AC power source;
  a second resistor with one end connected between the first resistor and the first input terminal of the operational amplifier and the other end connected to the ground;
  a third resistor with one end connected to the second input terminal of the operational amplifier and the other end connected to the AC power source; and
  a fourth resistor with one end connected between the third resistor and the second input terminal of the operational amplifier and the other end connected to the output terminal of the operational amplifier.

6. The power output control module for a power distributor of claim 1, wherein each of the at least one latch relay includes a switch terminal, an output terminal, a power terminal, a first loop terminal, and a second loop terminal, the switch terminal is selectively switched to the output terminal, the switching terminal is connected to the AC power source, the output terminal is connected to a corresponding electronic device, the power terminal, and the first loop terminal, the second loop terminal is connected to a corresponding relay driver, and the power terminal is connected to a power conversion circuit and the power storing device.

7. The power output control module for a power distributor of claim 6, wherein each one of the at least one relay driver includes:
  a turn-on unit connected to the processor, the power terminal, the first loop terminal, the power conversion circuit, and the power storing device; and
  a turn-off unit connected to the processor, the power terminal, the second loop terminal, the power conversion circuit, and the power storing device.

8. The power output control module for a power distributor of claim 7, wherein the turn-on unit includes:
  a first diode with a negative terminal connected to the power terminal of the latch relay, the power conversion circuit, and the power storing device, and a positive terminal connected to the first loop terminal of the latch relay;
  a first transistor having a first terminal, a second terminal, and a third terminal with the second terminal thereof connected to the positive terminal of the first diode and the first loop terminal, and the third terminal thereof connected to a first reference voltage level;
  a fifth resistor with one end connected to the first terminal of the first transistor and the other end connected to the processor; and
  a sixth resistor with one end connected to the first terminal of the first transistor and the fifth resistor and the other end connected to the third terminal of the first transistor and the first reference voltage level;
  wherein the processor sends a turn-on control signal to turn on the first transistor when receiving the output voltage signal that represents power supply from the AC power source, for electrical power to flow from the power terminal of the corresponding latch relay through the first loop terminal and the second and third terminals of the first transistor, to turn on the first transistor and switch the switch terminal to connect to the output terminal of the corresponding latch relay.

9. The power output control module for a power distributor of claim 8, wherein the turn-off unit includes:
  a second diode with a negative terminal connected to the power terminal of the latch relay, the power conversion circuit, and the power storing device and a positive terminal connected to the second loop terminal of the latch relay;
  a second transistor having a first terminal, a second terminal, and a third terminal, with the second terminal thereof connected to the positive terminal of the second diode and the second loop terminal and the third terminal thereof connected to a second reference voltage level;
  a seventh resistor with one end connected to the first terminal of the second transistor and the other end connected to the processor; and
  an eighth resistor with one end connected to the first terminal of the second transistor and the seventh resistor and the other end connected to the third terminal of the second transistor and the second reference voltage level;
  wherein the processor sends a turn-off control signal to turn off the second transistor when receiving the output voltage signal that represents disconnection between the AC power source and a corresponding latch relay for electrical power to flow from the power terminal of the corresponding latch relay through the second loop terminal and the second terminal and the third terminal of the second transistor to turn on the second transistor and disconnecting the switch terminals from the output terminal of the corresponding latch relay.

10. The power output control module for a power distributor of claim 1, wherein:
  the at least one relay driver includes a plurality of relay drivers connected to the processor, a power conversion circuit, and the power storing device; and
  the at least one latch relay includes a plurality of latch relays connected to the AC power source and the respective relay drivers, and each latch relay is connected to a corresponding electronic device.

11. The power output control module for a power distributor of claim 1, wherein when the AC power source is disconnected from the at least one latch relay, the electrical power stored in the power storing device is provided to the processor, the at least one relay driver and the at least one latch relay for the processor to control the at least one relay driver to drive the latch relay to be open.

* * * * *